Patented Dec. 27, 1927.

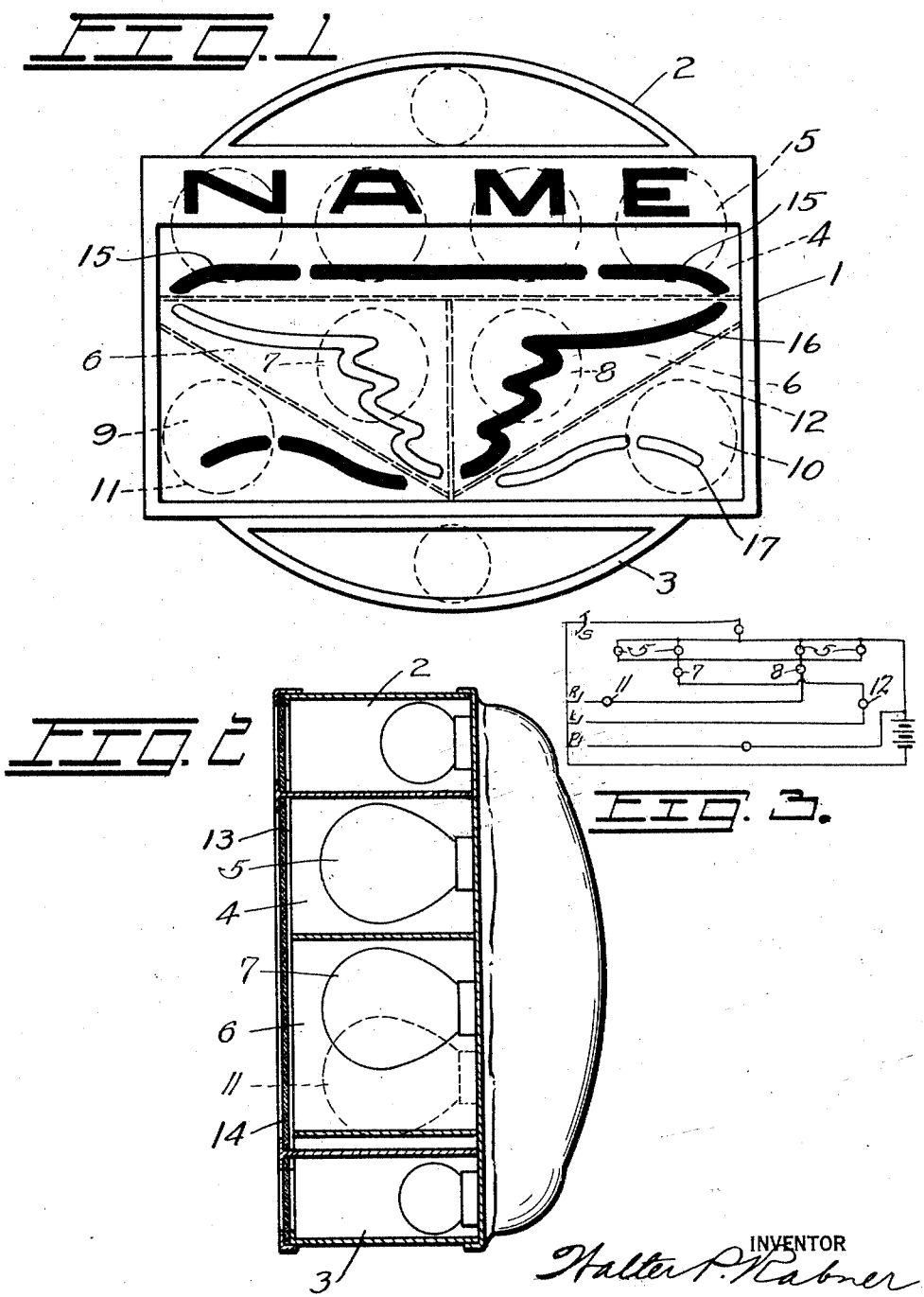

1,654,015

UNITED STATES PATENT OFFICE.

WALTER P. RABNER, OF TACOMA, WASHINGTON.

AUTO SIGNAL.

Application filed April 15, 1925. Serial No. 23,290.

The invention is a combined signal for motor vehicles in which a combination hand is used, which will point in either direction as may be desired.

The object of the invention is to provide a direction signal in which a combination hand may be used to point in either direction by lighting lamps in different sections of the hand alternately or as may be desired.

Another object of the invention is to provide a direction signal in combination with a stop signal and tail light.

And a further object of the invention is to provide a combined direction stop and tail light signal which is of a simple and economical construction.

With these ends in view the invention embodies a casing having a plurality of compartments therein with a lens in the central portion of the casing having a hand indicated thereon which is arranged so that it may appear to point in two directions by lighting lamps in different parts thereof. A stop signal is provided in an upper compartment and a tail light in a lower compartment.

Other features and advantages of the invention will appear from the following description, taken in connection with the drawings, wherein:—

Figure 1 is a front view with part broken away.

Figure 2 is a cross section.

In the drawings I have shown my device as it would be constructed wherein numeral 1 indicates the rectangular shaped casing having a curved compartment 2 at the top and another curved compartment 3 at the bottom.

The central portion 1 is divided into individual compartments as shown in dotted lines in Figure 1. The upper compartment 4 extends across the casing and is provided with lamps as indicated by the numeral 5. Although four lamps are shown, it is understood that two or any suitable number may be used. Below the compartment 4 are two triangular shaped compartments 6 in which are lamps 7 and 8 as indicated and below these two compartments are two other compartments 9 and 10 with lamps 11 and 12 in them.

In the front of the compartment in the central casing 1 is a plate 13 and in front of this plate is a lens 14. In the plate 13 are openings as indicated in Figure 1. These openings are formed so that the individual lines are in the individual compartments in the casing. In the section of the plate in front of the compartment 4 is a line 15 which would form the upper line of the fore finger or the top of the hand as desired. In the section of the plate in front of the compartments 5 and 6 are lines 16 which would indicate the lower edge of the fore finger and the outline of the knuckles. And in the compartments 9 and 10 are lines 17 which would indicate the lower line of the hand. It will be observed that in the design shown the lamps are lighted to indicate that the vehicle will turn to the right and in this arrangement the lamps 5, 8 and 11 are lighted; and it will be observed that if it is desired to indicate that the vehicle is going to turn in the opposite direction, the lamps 5, 7 and 12 will be lighted; the lamps 5 being used for either direction.

It will be understood that changes may be made in the construction without departing from the spirit of the invention. One of which changes may be in the design of the casing, another may be in the arrangement of the stop and tail light signals, another may be in the use of any desired number of lamps in individual compartments and still another may be in the actual shape of the lines indicating the hands.

It will be observed that the name of the car or any suitable wording or advertising matter may be placed on the face of the casing as shown.

Having thus fully described the invention, what I claim as new and desire to secure by Letters Patent, is:—

In a direction signal, a casing having a plurality of compartments, lamps in the said compartment, a glass in the open side of the said casing and in front of the said compartments, representations of oppositely disposed hands showable on the glass in front of the said compartments, said representations comprising a line indicating the upper edge of the forefinger of a hand extending from the center of the casing toward each side, another line indicating the lower edge of the said forefinger and the outer edges of three folded fingers on each side of the center of the said casing and corresponding with the said lines indicating the upper edges of the forefingers and other lines indicating the lower edges of hands on each side of the center of the said casing and corresponding with the said former lines of the hand, and said compartments being arranged to cooperate with certain of the said lines in two groups independently so that hands may be displayed pointing in either direction.

WALTER P. RABNER.